(12) United States Patent
Kandula

(10) Patent No.: US 11,301,280 B2
(45) Date of Patent: Apr. 12, 2022

(54) SYSTEM AND METHOD FOR MANAGING A MONITORING AGENT IN AN OPERATING SYSTEM OF A VIRTUAL COMPUTING INSTANCE

(71) Applicant: VMWARE, INC., Palo Alto, CA (US)

(72) Inventor: Srinivas Kandula, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 270 days.

(21) Appl. No.: 16/382,209

(22) Filed: Apr. 12, 2019

(65) Prior Publication Data

US 2020/0233692 A1 Jul. 23, 2020

(30) Foreign Application Priority Data

Jan. 23, 2019 (IN) .............................. 201941002846

(51) Int. Cl.
| | | |
|---|---|---|
| G06F 9/455 | (2018.01) | |
| H04L 29/08 | (2006.01) | |
| G06F 8/65 | (2018.01) | |
| G06F 9/4401 | (2018.01) | |
| G06F 8/61 | (2018.01) | |
| G06F 9/48 | (2006.01) | |
| H04L 67/00 | (2022.01) | |
| H04L 67/10 | (2022.01) | |

(52) U.S. Cl.
CPC ............ G06F 9/45558 (2013.01); G06F 8/61 (2013.01); G06F 8/65 (2013.01); G06F 9/4406 (2013.01); H04L 67/34 (2013.01); G06F 9/485 (2013.01); G06F 2009/45575 (2013.01); G06F 2009/45591 (2013.01); H04L 67/10 (2013.01)

(58) Field of Classification Search
CPC ...... G06F 9/45558; G06F 8/65; G06F 9/4406; G06F 8/61; G06F 2009/45575; G06F 2009/45591; G06F 9/485; H04L 67/34; H04L 67/10
See application file for complete search history.

(56) References Cited

U.S. PATENT DOCUMENTS

| | | | | |
|---|---|---|---|---|
| 6,272,677 | B1 * | 8/2001 | Lam ........................ | G06F 8/65 707/999.202 |
| 8,856,308 | B1 * | 10/2014 | Bollay .................... | H04L 63/06 709/223 |
| 2013/0111460 | A1 * | 5/2013 | Mohamed ................ | G06F 8/61 717/172 |
| 2013/0263088 | A1 * | 10/2013 | Hoff ..................... | G06F 9/45529 717/121 |
| 2015/0378763 | A1 * | 12/2015 | Hassine .................... | G06F 8/61 718/1 |
| 2016/0154665 | A1 * | 6/2016 | Iikura .................... | H04L 41/048 718/1 |
| 2017/0134301 | A1 * | 5/2017 | Chen ........................ | G06F 9/00 |
| 2018/0232517 | A1 * | 8/2018 | Roth ....................... | H04L 63/10 |

* cited by examiner

*Primary Examiner* — Michael W Ayers
(74) *Attorney, Agent, or Firm* — Loza & Loza, LLP

(57) ABSTRACT

A system and method for managing a monitoring agent in an operating system of a virtual computing instance uses a monitoring agent lifecycle service of the monitoring agent that is started as part of a startup process of the operating system of the virtual computing instance. When needed, a monitoring agent core of the monitoring agent is downloaded and installed from an external service to the virtual computing instance by the monitoring agent lifecycle service so that a monitoring operation of the virtual computing instance is performed by the monitoring agent core.

20 Claims, 7 Drawing Sheets

SYSTEM AND METHOD FOR MANAGING A MONITORING AGENT IN AN OPERATING SYSTEM OF A VIRTUAL COMPUTING INSTANCE

RELATED APPLICATIONS

Benefit is claimed under 35 U.S.C. 119(a)-(d) to Foreign Application Serial No. 201941002846 filed in India entitled "SYSTEM AND METHOD FOR MANAGING A MONITORING AGENT IN AN OPERATING SYSTEM OF A VIRTUAL COMPUTING INSTANCE", on Jan. 23, 2019, by VMWARE, Inc., which is herein incorporated in its entirety by reference for all purposes.

BACKGROUND

The performance of computing applications may be increased by distributing the computational workload across nodes in a networked cluster of computers. A physical networked cluster of computers with attendant software facilitating virtualization is referred to as a "cloud" or "cloud infrastructure". The software layer permits the underlying physical hardware associated with clouds, which can include servers, memory, storage, and network resources, to be viewed as virtualized units. These virtualized units represent some fraction of the underlying computing hardware or resources supported by the cloud infrastructure. Therefore, clouds may be viewed as a collection of virtual machines ("VMs"). Typically, a cloud may provide a variety of VM types with different computing (CPU), memory, and storage, networking, and Operating System (OS) options.

Currently, enterprises spend large amount of resources to provide 24×7 availability of their services running on clouds to end users by deploying various monitoring solutions, which require managing of monitoring agents. Managing these monitoring agents is an additional effort for the enterprises as the monitoring agents need to be patched/upgraded and reconfigured based on applications that are running on the VMs. There are many products in the market that need manual installation/upgrade of monitoring agents. In addition, these products deploy full-fledged agents that require a large footprint. Furthermore, some products may not support cross-cloud deployment of the monitoring agents.

SUMMARY

A system and method for managing a monitoring agent in an operating system of a virtual computing instance uses a monitoring agent lifecycle service of the monitoring agent that is started as part of a startup process of the operating system of the virtual computing instance. When needed, a monitoring agent core of the monitoring agent is downloaded and installed from an external service to the virtual computing instance by the monitoring agent lifecycle service so that a monitoring operation of the virtual computing instance is performed by the monitoring agent core.

A computer-implemented method for managing a monitoring agent in an operating system of a virtual computing instance in accordance with an embodiment of the invention comprises initiating a startup process of the operating system of the virtual computing instance, as part of the startup process of the operating system, starting a monitoring agent lifecycle service of the monitoring agent, downloading and installing a monitoring agent core of the monitoring agent from an external service to the virtual computing instance by the monitoring agent lifecycle service when the monitoring agent core is needed in the virtual computing instance, and performing a monitoring operation of the virtual computing instance by the monitoring agent core of the monitoring agent. In some embodiments, the steps of this method are performed when program instructions contained in a non-transitory computer-readable storage medium are executed by one or more processors.

A system in accordance with an embodiment of the invention comprises memory and at least one processor configured to initiate a startup process of the operating system of a virtual computing instance, as part of the startup process of the operating system, start a monitoring agent lifecycle service of the monitoring agent, download and install a monitoring agent core of the monitoring agent from an external service to the virtual computing instance by the monitoring agent lifecycle service when the monitoring agent core is needed in the virtual computing instance, and perform a monitoring operation of the virtual computing instance by the monitoring agent core of the monitoring agent.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

The embodiments of the invention are illustrated by way of example, and not by way of limitation, in the figures of the accompanying drawings in which.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
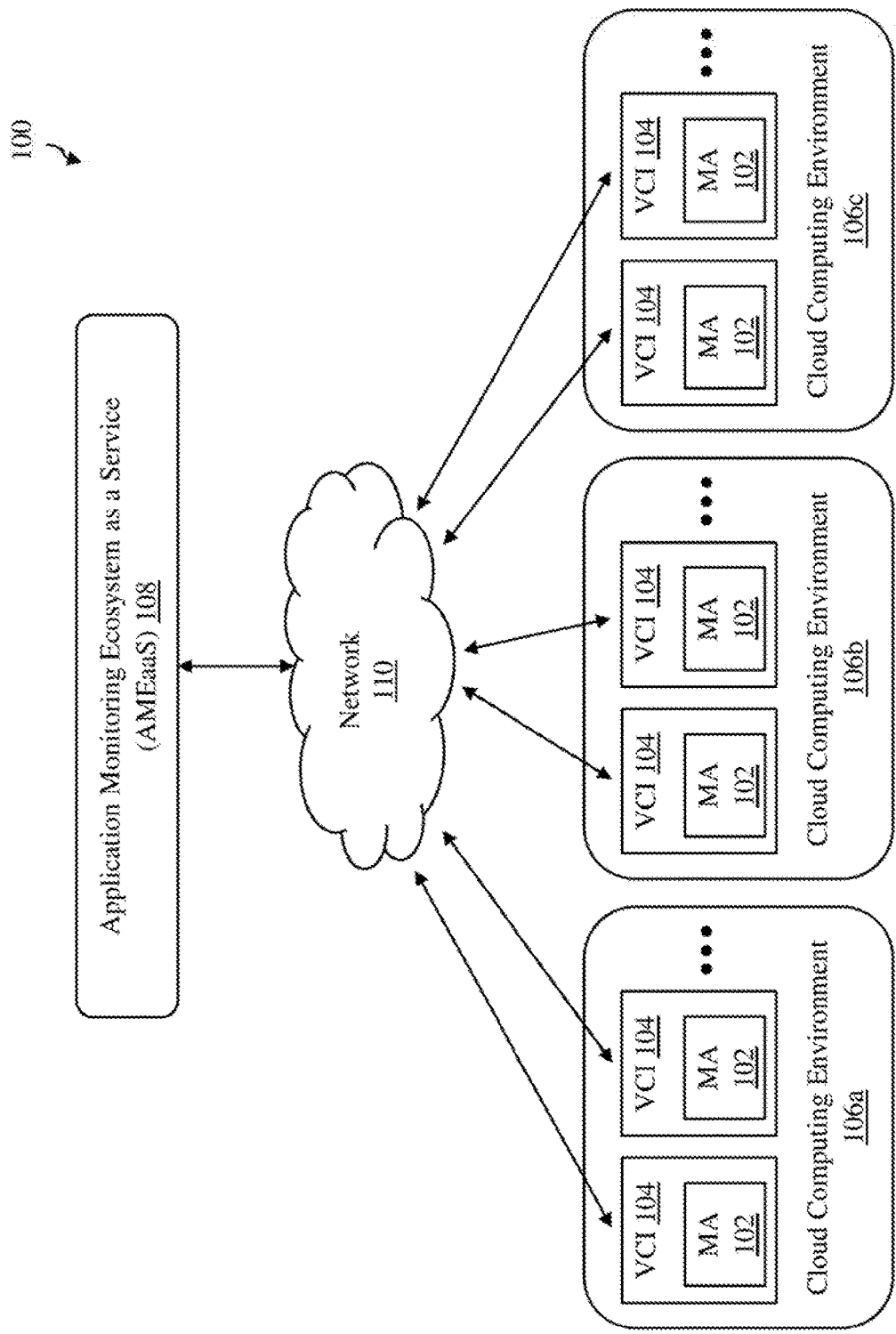
FIG. 1 is a block diagram of a system in accordance with one embodiment of the invention.

FIG. 1 shows a system 100 for deploying and managing monitoring agents (MAs) 102 in virtual computing instances (VCIs) 104 running in one or more cloud computing environments, such as cloud computing environments 106a, 106b and 106c, in accordance with one embodiment of the invention. As shown in FIG. 1, the system includes an Application Monitoring Ecosystem as a Service (AMEaaS) 108, which can communicate with the monitoring agents 102 via a network 110. As described in detail below, the system 100 allows for cross-cloud deployment of monitoring agents and efficient updating and patching of the deployed monitoring agents using the AMEaaS 108 as a central service to facilitate these processes.

As used herein, the term "virtual computing instance" refers to any software processing entity that can run on a computer system, such as a software application, a software process, a virtual machine or a virtual container. A virtual machine is an emulation of a physical computer system in the form of a software computer that, like a physical computer, can run an operating system and applications. A virtual machine may be comprised of a set of specification and configuration files and is backed by the physical resources of the physical host computer. A virtual machine may have virtual devices that provide the same functionality as physical hardware and have additional benefits in terms of portability, manageability, and security. An example of a virtual machine is the virtual machine created using VMware vSphere® solution made commercially available from VMware, Inc of Palo Alto, Calif. A virtual container is a package that relies on virtual isolation to deploy and run applications that access a shared operating system (OS) kernel. An example of a virtual container is the virtual container created using a Docker engine made available by Docker, Inc. In this disclosure, the virtual computing instances will be described as being virtual machines, although embodiments of the invention described herein are not limited to virtual machines.

As shown in FIG. 1, the VCIs 104 with the monitoring agents 102 are deployed in the cloud computing environments 106a, 106b and 106c. These cloud computing environments include physical host computers, physical network components and other hardware, which allow the virtual machines to be deployed and allows the monitoring agents to communicate with the AMEaaS 108 via the network 110, which may include the Internet, a wide area network (WAN), a local area network (LAN), a storage area network (SAN), a Fibre Channel network and/or other networks. The cloud computing environments 106a, 106b and 106c can be any type of cloud environments, such as Amazon Web Services (AWS) environments, Azure environments and Google Cloud Platform (GCP) environments.

The AMEaaS 108 operates to support the monitoring agents 102 deployed in virtual computing instances 104 running in the cloud computing environments 106a, 106b and 106c. As explained in more detail below, the AMEaaS can provide the core module of the monitoring agents when the monitoring agents are initially installed and registered with the AMEaaS. The AMEaaS can also provide any updates or patches for the monitoring agents, as well as any plugins that are needed by the monitoring agents. The AMEaaS also aggregates metrics collected by the monitoring agents so that the collected metrics can be analyzed and queried for use. The AMEaaS may be implemented as one or more software programs and deployed in any computing environment, including any of the cloud computing environments 106a, 106b and 106c. In some embodiments, the AMEaaS may be deployed as a collection of microservices that cooperate to support the deployed monitoring agents. The AMEaaS will be described in more detail below.

Figure 2:
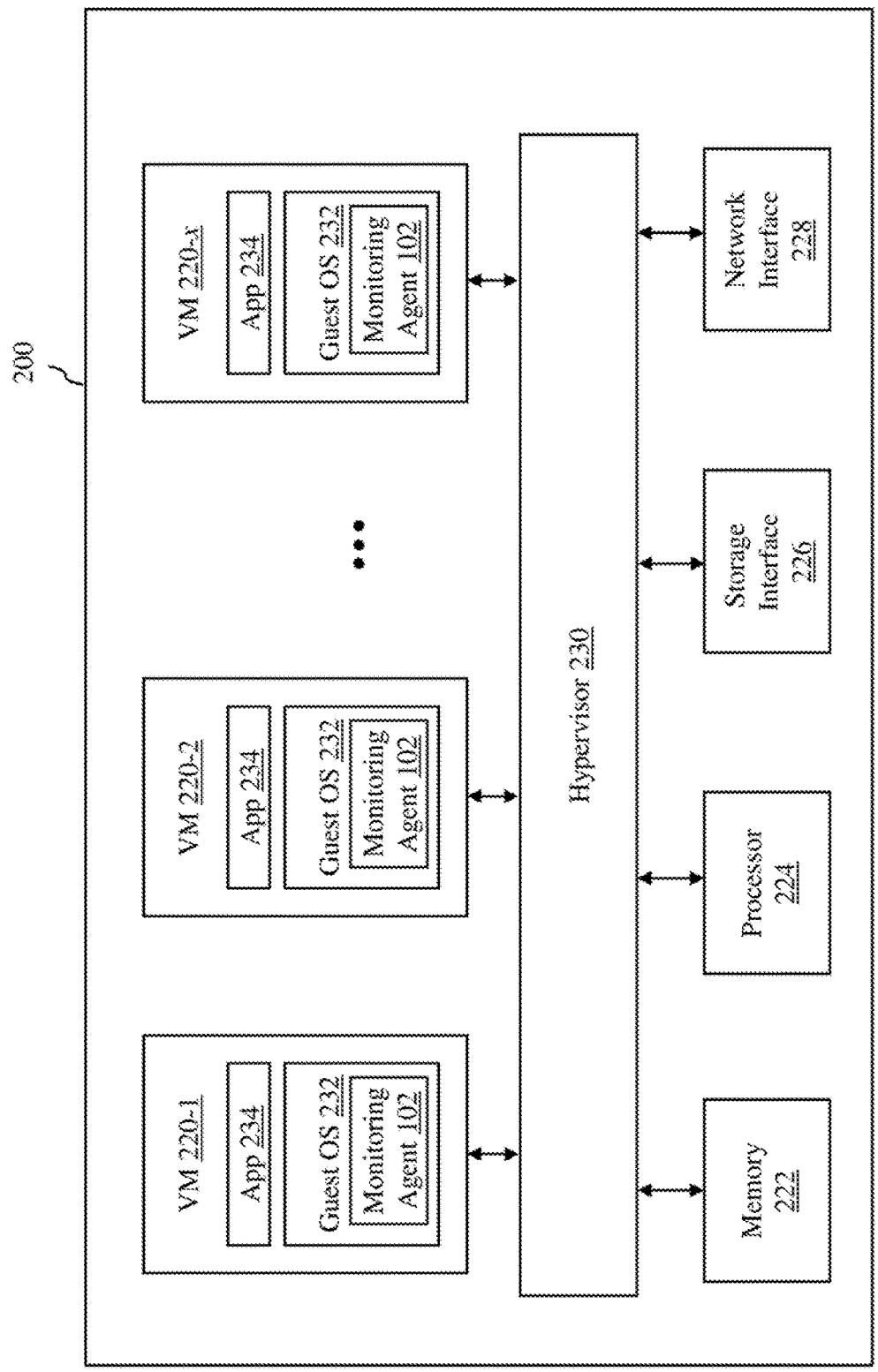
FIG. 2 is a bock diagram of a host computer with virtual machines (VMs) with monitoring agents, which can be provisioned in the system of FIG. 1, in accordance with an embodiment of the invention.

Turning now to FIG. 2, a host computer 200 that may be provisioned in any of the cloud computing environments 106a, 106b and 106c in accordance with an embodiment of the invention is show. In FIG. 2, the physical connections between the various components of the host computer 200 are not illustrated. In the illustrated embodiment, the host computer is configured to support a number of virtual computing instances 220-1, 220-2 . . . 220-x (where x is a positive integer), which are shown as being virtual machines (VMs). The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows that host computer to communicate with a storage (not shown). As an example, the storage interface may be a host bus adapter or a network file system interface. The network interface 228 is an interface that allows the host computer to communicate with other devices connected to the network 110. As an example, the network interface may be a network adapter.

In the illustrated embodiment, the VMs 220-1, 220-2 ... 220-x run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 232 with a monitoring agent 102 and one or more guest applications 234. The guest operating system manages virtual system resources made available to the corresponding VM by the hypervisor 230, and, among other things, the guest operating system 234 forms a software platform on top of which the guest applications 234 run. The monitoring agent in each VM monitors and collects various metrics from that VM, including system metrics and application metrics. The monitoring agent in each VM will be described in more detail below.

The VMs 220-1, 220-2 ... 220-x are able to communicate with each other using an internal software OSI Layer 2 switch (not shown) and with other computer systems connected to the network 110 using the network interface 228 of the host computer 200. In addition, the VMs are able to access storage using the storage interface 226 of the host computer.

Figure 3:
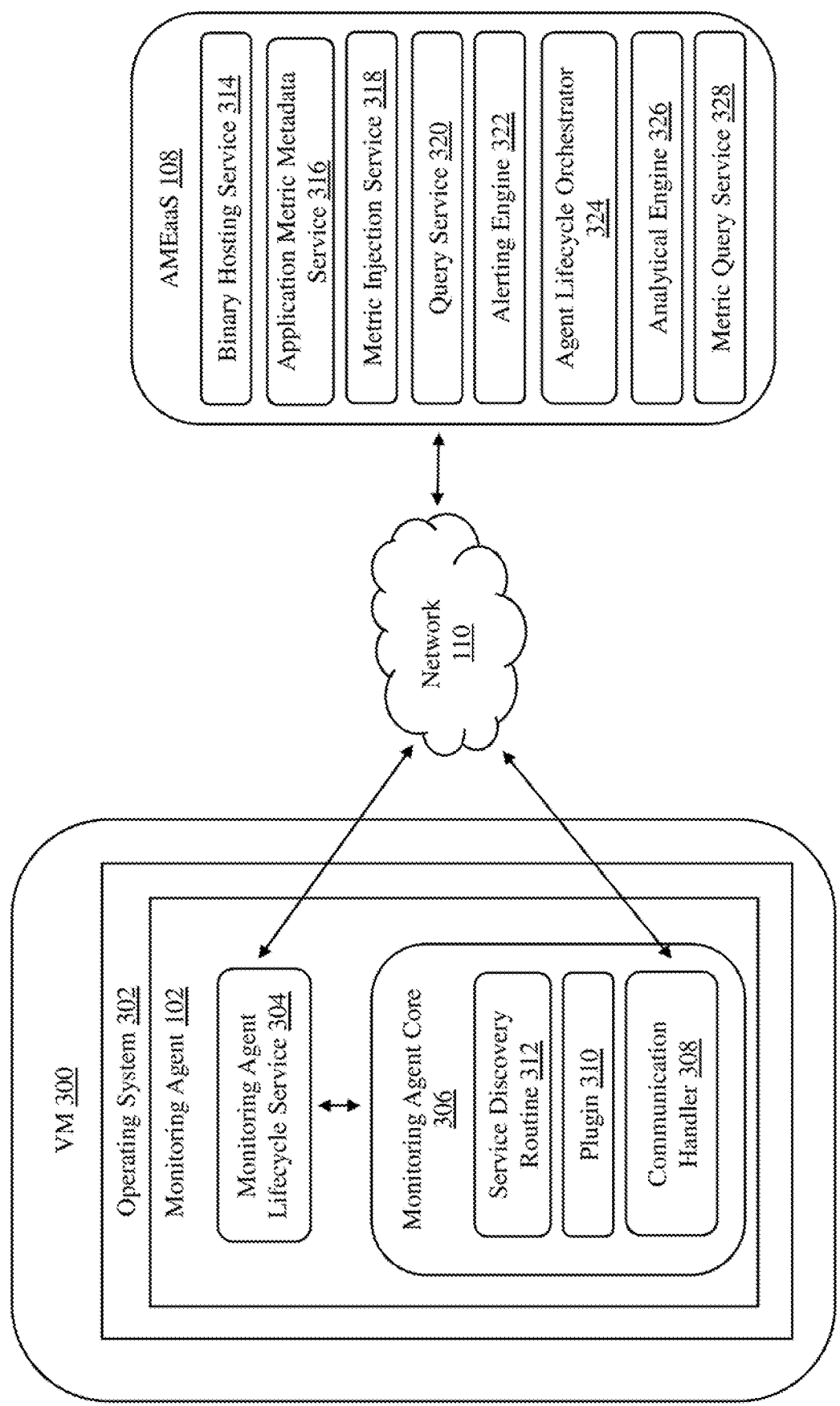
FIG. 3 shows components of a VM with a monitoring agent and components of an Application Monitoring Ecosystem as a Server (AMEaaS) of the system of FIG. 1 in accordance with an embodiment of the invention.

Turning now to FIG. 3, a VM 300 that is representative of the VMs 220-1, 220-2 ... 220-x in the host computer 200 in accordance with an embodiment of the invention is shown. The VM 300 is a software implementation of a computer system. Thus, the VM 300 provides a complete system platform, which supports the execution of a complete operating system (OS) 302 in addition to one or more applications. The VM 300 may be instantiated in any of the cloud computing environments 106a, 106b and 106c using an image, which is typically a file system image, which may include the OS and one or more application to be executed by the VM.

As illustrated in FIG. 3, the VM 300 includes the OS 302, which will be started each time the VM is executed or turned on in the host computer 200. The OS 302 can be any type of a known OS, such Linux, Unix or Windows OS. The OS 302 includes a monitoring agent 102, which is comprised of a monitoring agent lifecycle service (MALS) 304 and a monitoring agent core 306. That is, the monitoring agent 102 is part of the OS 302, and thus, is started whenever the OS is started in the VM.

In an embodiment, the MALS 304 is bundled in a bootstrap program of the OS 302 without the monitoring agent core 306 to reduce the size of an image for deployment of the VM 300. Once the MALS is up and running, the MALS can download the latest version of the monitoring agent core 306 from the AMEaaS 108. Thus, the MALS can independently communicate with the AMEaaS without the monitoring agent core. The MALS can register itself with the AMEaaS using AMEaaS credentials, which may be assigned to the MALS when the VM is deployed. The MALS can also download patches, upgrades and plugins for the monitoring agent core. In an embodiment, the plugins may be small programs for collecting metrics from particular applications. The MALS may be shut down when the monitoring agent core is properly running so that footprint of the monitoring agent is reduced in the VM.

The monitoring agent core 306 operates to perform monitoring processes on the VM 300, which may involve collecting system metrics from the VM and application metrics from any applications running in the VM and sending the collected metrics to the AMEaaS 108. These metrics may include disk, CPU, network, and process metrics. For some applications, there may be plugins to properly collect metrics for those applications. Thus, the monitoring agent core may have one or more plugins to monitor different applications that are installed and running in the VM.

In an embodiment, as illustrated in FIG. 3, the monitoring agent core 306 includes a communication handler 308, one or more plugins 310 and a service discovery routine 312. The communication handler 308 operates to manage communications between the monitoring agent core and the AMEaaS 108. The communication handler may use any communication protocol for communications with the AMEaaS. The service discovery routine 312 operates to find known applications and/or services running in the VM 300 and report the finding back to the AMEaaS via the communication handler. In an embodiment, the service discovery routine may periodically scan the process registry (not shown) of the VM to find any change in the applications/services running in the VM. The process registry of the VM contains information on the applications and/or services running in the VM. Each plugin 310 installed in the monitoring agent core is programmed to collect metrics from an associated application. Thus, when the service discovery routine 312 finds any change in the applications/services running in the VM, the discovered change is communicated to the AMEaaS so that appropriate action can be taken, e.g., one or more plugins can be installed and/or uninstalled in the VM. In particular, if the service discovery routine finds that an application has been deleted from the VM, this application deletion is reported to the AMEaaS so that the corresponding plugin can be uninstalled from the monitoring agent core. However, if the service discovery routine finds that an application has been added to the VM, this application addition is reported to the AMEaaS so that the corresponding plugin can be installed in the monitoring agent core.

In an embodiment, as illustrated in FIG. 3, the AMEaaS 108 is a set of microservices, which include a binary hosting service 314, an application metric metadata service 316, a metric injection service 318, a query service 320, an alerting engine 322, an agent lifecycle orchestrator 324, an analytical engine 326 and a metric query service 328. The binary hosting service 314 maintains monitoring agent binaries and plugins that need to be pushed to the various VMs that may reside in the different cloud computing environments 106a, 106b and 106c, including the VM 300. The monitoring agent binaries and plugins may be stored in a storage (not shown) that is accessible by the binary hosting service. The application metric metadata service 316 stores application signature information and metrics that need to be collected for each application running in the VMs, which are used by the service discovery modules of the monitoring agents in the VMs to identify applications running in their respective VMs. The application metric metadata service also stores the metric details for each application, such as the default collection interval, the type of metric, default threshold for the metric, and alert configuration information. The metric injection service 318 consumes the collected metrics in a specified format and stores the formatted metrics into a persistent storage. The query service 320 provides a mechanism to perform various query operations on the metric data using a user interface. The alerting engine 322 generates alerts if a metric crosses a threshold for that metric. The agent lifecycle orchestrator 324 controls the connected monitoring agents to start/stop, upgrade, patch and uninstall by interacting with the MALS of the monitoring agents in the VMs. The analytical engine 326 performs various analytics on the collected metrics. The metric query service 328 provides metric query language support to query the collected metric data.

Figure 4:
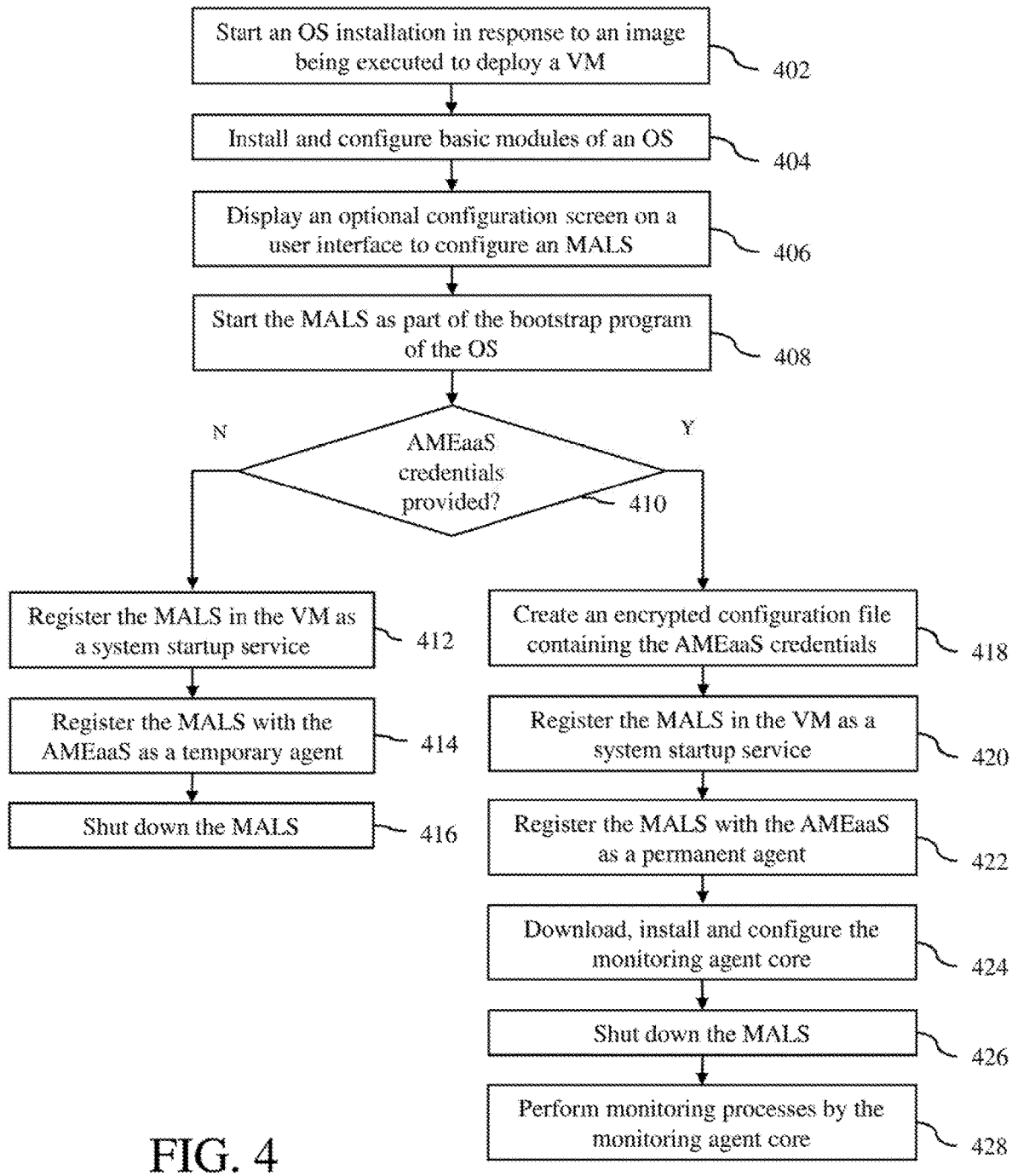
FIG. 4 is a flowchart of an operation of starting an operating system (OS) of a VM for the first time in accordance with an embodiment of the invention.

An operation of starting the OS 302 of the VM 300 for the first time, which illustrates the functionalities of the MALS 304 and the monitoring agent core 306 of the monitoring agent 102 during such an operation, in accordance with an embodiment of the invention is described with reference to a flow diagram of FIG. 4. The operation begins at block 402, where an OS installation is started in response to an image being executed to deploy the VM 300. The start of the OS installation initiates an installer, which handles the OS installation. Next, at block 404, basic modules of the OS 302 are installed and configured by the installer. The basic modules may include input/output (I/O) devices, network devices, etc.

Next, at block 406, an optional configuration screen is displayed by the installer on a user interface, which allows a user to configure the MALS 304. As an example, the user may configure AMEaaS registered username, password and AMEaaS license details for the MALS.

Next, at block 408, the MALS 304 is started by the installer. In an embodiment, the MALS is started as part of the bootstrap program of the OS 302. Next, at block 410, a determination is made by the installer whether AMEaaS credentials for the MALS have been provided.

If the AMEaaS credentials have not been provided, the MALS 304 is registered in the VM 300 as a system startup service by the installer, at block 412. As a system startup service, the MALS will be started each time the VM is booted. Next, at block 414, the MALS is registered with the AMEaaS 108 as a temporary agent. In an embodiment, a temporary agent is assigned a temporary identification, which may include any number of characters, such as letters and numbers, and/or symbols, that is stored in the AMEaaS. This allows administrators to determine how many VMs are not being monitored. In an embodiment, this registration procedure is performed by the MALS itself. Next, at block 416, the MALS is shut down by the installer. That is, the operation of the MALS is terminated.

However, if the AMEaaS credentials have been provided, an encrypted configuration file containing the AMEaaS credentials is created by the installer, at block 418. The encrypted configuration file may also contain licensing details and may be encrypted using symmetric encryption algorithm for security purposes. In a particular implementation, the configuration file may be stored under the "MALS-install-location/conf" directory. Next, at block 420, the MALS 304 is registered as a system startup service for the VM 300 by the installer. Again, as a system startup service, the MALS will be started each time the VM is booted.

Next, at block 422, the MALS 304 is registered with the AMEaaS 108 as a permanent or standard agent using the AMEaaS credentials. Next, at block 424, as a standard agent, the monitoring agent core 306 is downloaded, installed and configured at the VM 300 by the MALS because the monitoring agent core is needed in the monitoring agent 102. The monitoring agent core is needed because the monitoring agent core was not included in the image of the VM. In an embodiment, the configuration process for the monitoring agent core includes registering the monitoring agent with the AMEaaS by passing the media access control (MAC) address, Internet Protocol (IP) address of the host (i.e., the VM 300) and getting a token from the AMEaaS, which will be used by the monitoring agent for further communications with the AMEaaS. The configuration process may also include creating a configuration file that contains agent core configuration details, such as metric collection interval, token, port number, metrics that can be excluded or included, active plugins and their configuration details.

Next, at block 426, the MALS 304 is shut down by the monitoring agent core 306. Next, at block 428, monitoring processes are performed by the monitoring agent core, which is now up and running. The monitoring processes may include collecting system metrics from the VM 300 and application metrics from any applications running in the VM and sending the collected metrics to the AMEaaS 108.

Figure 5:
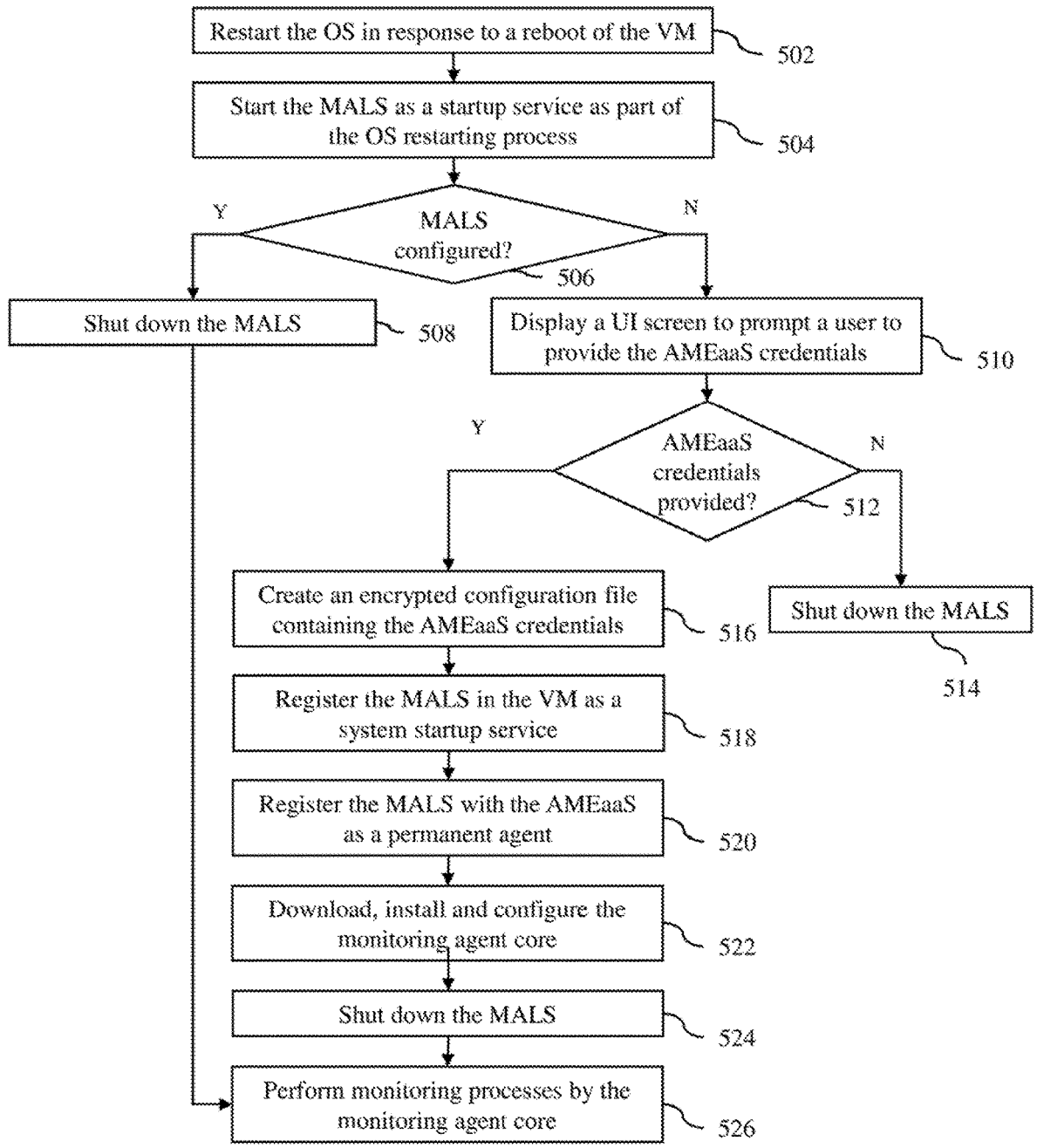
FIG. 5 is a flowchart of an operation of restarting the OS of the VM in accordance with an embodiment of the invention.

An operation of restarting the OS 302 of the VM 300, which illustrates the functionalities of the MALS 304 and the monitoring agent core 306 of the monitoring agent 102 during such a process, in accordance with an embodiment of the invention is described with reference to a flow diagram of FIG. 5. In this restarting operation, it is assumed that the MALS has been registered as a startup service. The operation begins at block 502, where the OS is restarted in response to a reboot of the VM. Next, at block 504, the MALS is started as a startup service as part of the OS restarting process. It is noted here that the monitoring agent core may be started as well if the monitoring agent core was also registered as a startup service when the OS was started for the first time.

Next, at block 506, a determination is made by the MALS 304 whether the MALS has already been configured. That is, the MALS determines whether the monitoring agent core 306 is needed in the VM, or whether the monitoring agent core has already been downloaded and installed in the VM. In an embodiment, this information may be stored in the encrypted configuration file for the MALS. If the MALS has been configured, the MALS is shut down, at block 508. In an embodiment, the MALS is shut down by itself. In an alternative embodiment, the MALS is shut down by the monitoring agent core. In this alternative embodiment, the MALS may be shut down by the monitoring agent core anytime after the monitoring agent core has been started. Next, at block 526, monitoring processes are performed by the monitoring agent core.

However, if the MALS 304 has not been configured, a UI screen may be displayed by the MALS to prompt a user to provide the AMEaaS credentials for the MALS, at block 510. In response to the UI screen, a user can enter the AMEaaS credentials. Next, at block 512, a determination is made by the MALS whether the AMEaaS credentials have been provided via the UI screen. If the AMEaaS credentials have not been provided, the process proceeds to block 514, where the MALS is shut down by itself. The process then comes to an end with respect to the monitoring agent 102 of the VM 300. However, if the AMEaaS credentials have been provided, the process proceeds to block 516.

At block 516, an encrypted configuration file containing the AMEaaS credentials is created by the MALS 304. Next, at block 518, the MALS is registered as a system startup service for the VM 300. Next, at block 520, the MALS is registered with the AMEaaS 108 as a permanent or standard agent using the AMEaaS credentials. In an embodiment, the creation of the encrypted configuration file, the registering the MALS as a system startup service and the registering with the AMEaaS are performed by the MALS. Next, at block 522, as a standard agent, the monitoring agent core 306 is downloaded, installed and configured at the VM by the MALS.

Next, at block 524, the MALS 304 is shut down by the monitoring agent core 306. The operation then proceeds to block 526, where monitoring processes are performed by the monitoring agent core, which may include collecting system metrics from the VM 300 and application metrics from any applications running in the VM and sending the collected metrics to the AMEaaS 108.

Figure 6:
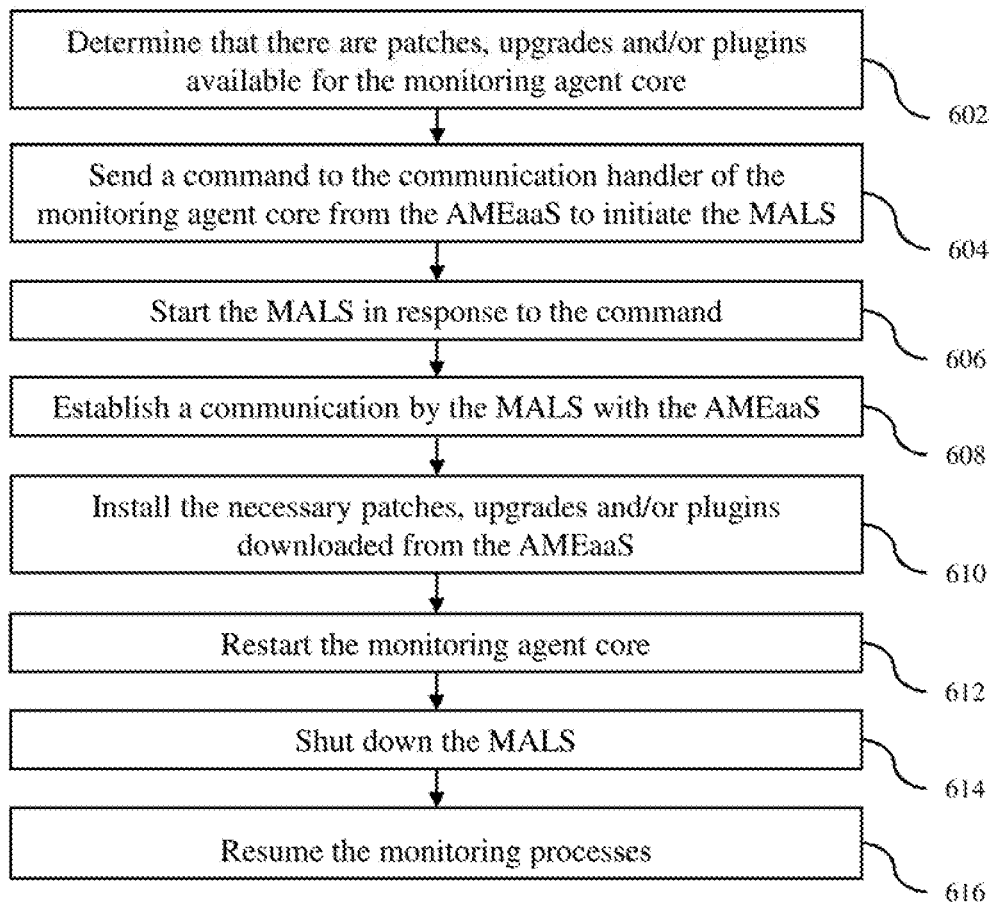
FIG. 6 is a flowchart of an operation of modifying a monitoring agent core of a monitoring agent in accordance with an embodiment of the invention.

An operation of modifying the monitoring agent core 306 of the monitoring agent 102 in the VM 300 in accordance with an embodiment of the invention is described with reference to a flow diagram of FIG. 6. The operation begins at block 602, where a determination is made by the AMEaaS 108 that there are any patches, upgrades and/or plugins available for the monitoring agent core of the monitoring agent in the VM.

Next, at block 604, a command is sent to the communication handler 308 of the monitoring agent core 306 from the AMEaaS 108 to initiate the MALS 304 in the monitoring agent 102 of the VM 300. Next, at block 606, the MALS is started by the monitoring agent core in response to the command.

Next, at block 608, a communication is established by the MALS 304 with the AMEaaS 108. Next, at block 610, the necessary patches, upgrades and/or plugins are downloaded from the AMEaaS and installed in the VM 300, which may involve shutting down the monitoring agent core 306. As part of this process, the MALS may rollback the monitoring agent core 306 when an upgrading or patching of the monitoring agent core is unsuccessful. In addition, as part of this process, the MALS may also uninstall any plugins that are no longer needed for the monitoring agent core.

Next, at block 612, the monitoring agent core 306 is restarted by the MALS 304 after a successful installation of the necessary patches, upgrades and/or plugins. Next, at block 614, the MALS is shut down by the monitoring agent core since the MALS is no longer needed. Next, at block 616, the monitoring processes are resumed by the monitoring agent core 306.

Figure 7:
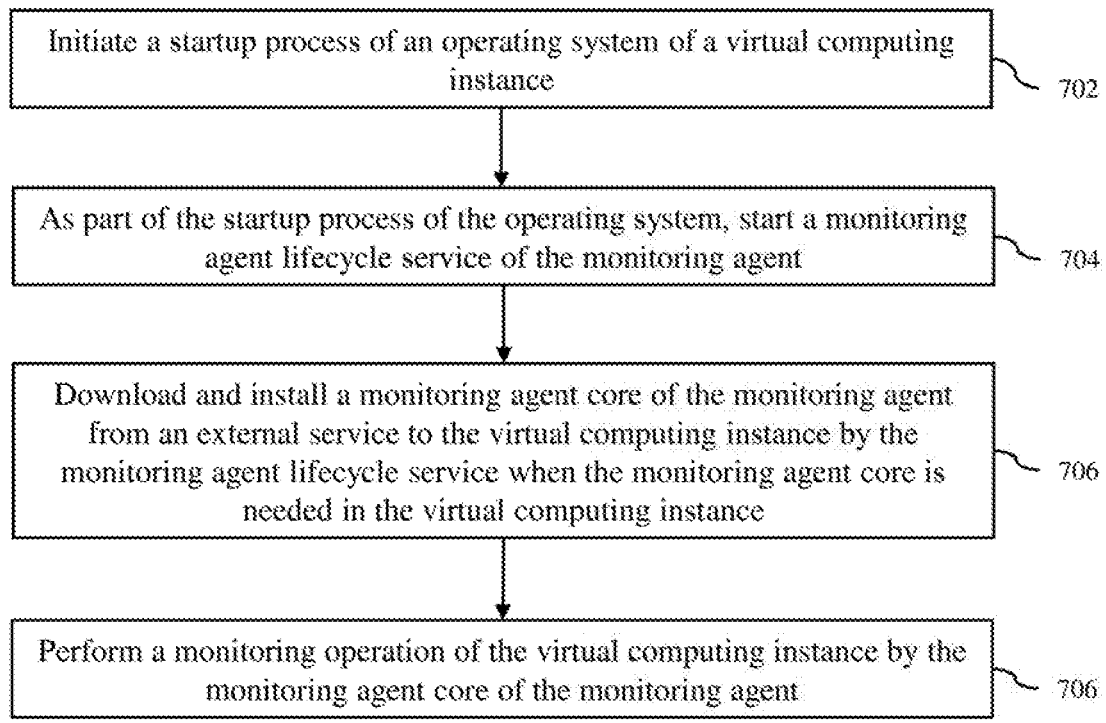
FIG. 7 is a process flow diagram of a computer-implemented method for managing a monitoring agent in an OS of a virtual computing instance in accordance with an embodiment of the invention.

A computer-implemented method for managing a monitoring agent in an operating system of a virtual computing instance in accordance with an embodiment of the invention is described with reference to a flow diagram of FIG. 7. At block 702, a startup process of the operating system of the virtual computing instance is initiated. At block 704, as part of the startup process of the operating system, a monitoring agent lifecycle service of the monitoring agent is started. At block 706, a monitoring agent core of the monitoring agent is downloaded and installed from an external service to the virtual computing instance by the monitoring agent lifecycle service when the monitoring agent core is needed in the virtual computing instance. At block 708, a monitoring operation of the virtual computing instance is performed by the monitoring agent core of the monitoring agent.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for managing a monitoring agent in an operating system of a virtual computing instance, the method comprising:
   initiating a startup process of the operating system of the virtual computing instance;
   as part of the startup process of the operating system, starting a monitoring agent lifecycle service of the monitoring agent in the virtual computing instance;
   registering the monitoring agent lifecycle service as an agent with an external service that interfaces with and supports multiple monitoring agents including the monitoring agent using credentials for the monitoring agent lifecycle service running in the virtual computing instance;
   after the monitoring agent lifecycle service has been registered with the external service, downloading and installing a latest version of a monitoring agent core of the monitoring agent from the external service to the virtual computing instance by the monitoring agent lifecycle service;
   performing a monitoring operation of the virtual computing instance by the monitoring agent core of the monitoring agent;
   after the monitoring agent core has been installed and running in the virtual computing instance, shutting down the monitoring agent lifecycle service of the monitoring agent in the virtual computing instance;
determining at the external service that at least one of an upgrade and a patch is available for the monitoring agent core running in the virtual computing instance;
sending a command to initiate the monitoring agent lifecycle service of the monitoring agent to the monitoring agent core from the external service;
in response to the command, re-starting the monitoring agent lifecycle service of the monitoring agent in the virtual computing instance; and
after the monitoring agent lifecycle service has been re-started, performing a patching or upgrade operation for the monitoring agent core by the monitoring agent lifecycle service using the upgrade or the patch to be downloaded from the external service.

2. The method of claim 1, further comprising starting a bootstrap program of the operating system, wherein the monitoring agent lifecycle service is bundled in the bootstrap program.

3. The method of claim 1, further comprising, after the monitoring agent lifecycle service has been started, registering the monitoring agent lifecycle service as a startup service for the virtual computing instance.

4. The method of claim 1, further comprising, after the monitoring agent core has been downloaded, registering the monitoring agent core as a system startup service of the virtual computing instance.

5. The method of claim 1, further comprising downloading and installing a plugin for collecting metrics of an application from the external service when the application is discovered to be running in the virtual computing instance.

6. The method of claim 1, wherein a guest operating system of a virtual machine includes the monitoring agent.

7. The method of claim 1, wherein performing the monitoring operation of the virtual computing instance includes finding that an application has been deleted from the virtual computing instance by a service discovery routine of the monitoring agent core so that a corresponding plugin can be uninstalled from the monitoring agent core, wherein the corresponding plugin is programmed to collect metrics from the application.

8. The method of claim 1, wherein performing the monitoring operation of the virtual computing instance includes finding that an application has been added to the virtual computing instance by a service discovery routine of the monitoring agent core so that a corresponding plugin can be installed from the monitoring agent core, wherein the corresponding plugin is programmed to collect metrics from the application.

9. A non-transitory computer-readable storage medium containing program instructions for a method for managing a monitoring agent in an operating system of a virtual computing instance, wherein execution of the program instructions by one or more processors of a computer system causes the one or more processors to perform steps comprising:
 initiating a startup process of the operating system of the virtual computing instance;
 as part of the startup process of the operating system, starting a monitoring agent lifecycle service of the monitoring agent in the virtual computing instance;
 registering the monitoring agent lifecycle service as an agent with an external service that interfaces with and supports multiple monitoring agents including the monitoring agent using credentials for the monitoring agent lifecycle service running in the virtual computing instance;
 after the monitoring agent lifecycle service has been registered with the external service, downloading and installing a latest version of a monitoring agent core of the monitoring agent from the external service to the virtual computing instance by the monitoring agent lifecycle service;
 performing a monitoring operation of the virtual computing instance by the monitoring agent core of the monitoring agent;
 after the monitoring agent core has been installed and running in the virtual computing instance, shutting down the monitoring agent lifecycle service of the monitoring agent in the virtual computing instance;
 determining at the external service that at least one of an upgrade and a patch is available for the monitoring agent core running in the virtual computing instance;
 sending a command to initiate the monitoring agent lifecycle service of the monitoring agent to the monitoring agent core from the external service;
 in response to the command, re-starting the monitoring agent lifecycle service of the monitoring agent in the virtual computing instance; and
 after the monitoring agent lifecycle service has been re-started, performing a patching or upgrade operation for the monitoring agent core by the monitoring agent lifecycle service using the upgrade or the patch to be downloaded from the external service.

10. The non-transitory computer-readable storage medium of claim 9, wherein the steps further comprise starting a bootstrap program of the operating system, wherein the monitoring agent lifecycle service is bundled in the bootstrap program.

11. The non-transitory computer-readable storage medium of claim 9, wherein the steps further comprise, after the monitoring agent lifecycle service has been started, registering the monitoring agent lifecycle service as a startup service for the virtual computing instance.

12. The non-transitory computer-readable storage medium of claim 9, wherein the steps further comprise, after the monitoring agent core has been downloaded, registering the monitoring agent core as a system startup service of the virtual computing instance.

13. The non-transitory computer-readable storage medium of claim 9, wherein the steps further comprise downloading and installing a plugin for collecting metrics of an application from the external service when the application is discovered to be running in the virtual computing instance.

14. The non-transitory computer-readable storage medium of claim 9, wherein a guest operating system of a virtual machine includes the monitoring agent.

15. The non-transitory computer-readable storage medium of claim 9, wherein performing the monitoring operation of the virtual computing instance includes finding that an application has been deleted from the virtual computing instance by a service discovery routine of the monitoring agent core so that a corresponding plugin can be uninstalled from the monitoring agent core, wherein the corresponding plugin is programmed to collect metrics from the application.

16. The non-transitory computer-readable storage medium of claim 9, wherein performing the monitoring operation of the virtual computing instance includes finding that an application has been added to the virtual computing instance by a service discovery routine of the monitoring agent core so that a corresponding plugin can be installed from the monitoring agent core, wherein the corresponding plugin is programmed to collect metrics from the application.

17. A system comprising:
memory; and
at least one processor configured to:
- initiate a startup process of an operating system of a virtual computing instance;
- as part of the startup process of the operating system, start a monitoring agent lifecycle service of the monitoring agent in the virtual computing instance;
- register the monitoring agent lifecycle service as an agent with an external service that interfaces with and supports multiple monitoring agents including the monitoring agent using credentials for the monitoring agent lifecycle service running in the virtual computing instance;
- after the monitoring agent lifecycle service has been registered with the external service, download and install a latest version of a monitoring agent core of the monitoring agent from the external service to the virtual computing instance by the monitoring agent lifecycle service;
- perform a monitoring operation of the virtual computing instance by the monitoring agent core of the monitoring agent;
- after the monitoring agent core has been installed and running in the virtual computing instance, shut down the monitoring agent lifecycle service of the monitoring agent in the virtual computing instance;
- determine at the external service that at least one of an upgrade and a patch is available for the monitoring agent core running in the virtual computing instance;
- send a command to initiate the monitoring agent lifecycle service of the monitoring agent to the monitoring agent core from the external service;
- in response to the command, re-start the monitoring agent lifecycle service of the monitoring agent in the virtual computing instance; and
- after the monitoring agent lifecycle service has been re-started, perform a patching or upgrade operation for the monitoring agent core by the monitoring agent lifecycle service using the upgrade or the patch to be downloaded from the external service.

18. The system of claim 17, wherein the at least one processor is further configured to start a bootstrap program of the operating system, wherein the monitoring agent lifecycle service is bundled in the bootstrap program.

19. The system of claim 17, wherein a guest operating system of a virtual machine includes the monitoring agent.

20. The system of claim 17, wherein the monitoring agent core includes a service discovery routine that is configured to find that an application has been added or deleted from the virtual computing instance so that a corresponding plugin can be installed or uninstalled from the monitoring agent core, wherein the corresponding plugin is programmed to collect metrics from the application.

* * * * *